3,057,906
PREPARATION OF ALIPHATIC NITRILES BY CATALYZED REACTION OF HYDROCARBONS WITH CYANOGEN OR HYDROGEN CYANIDE
William L. Fierce, Crystal Lake, and Walter J. Sandner, Carpentersville, Ill., assignors to The Pure Oil Company, Chicago, Ill., a corporation of Ohio
No Drawing. Filed Apr. 27, 1959, Ser. No. 808,911
15 Claims. (Cl. 260—465.3)

This invention comprises a new and improved process for the preparation of aliphatic nitriles by reaction of a $C_2$–$C_{20}$ alkane or alkene with cyanogen or hydrogen cyanide at a temperature from about 475° to 1000° C. in the presence of a group VIII noble metal-containing catalyst.

In our previously issued Patent 2,802,020, we have disclosed a process for the preparation of acetonitrile by reaction of methane with cyanogen at temperatures of 700°–1200° C. In Patent 2,809,987, we have disclosed a process in which ethane and cyanogen are reacted at temperatures above 700° C. to produce ethylene and acrylonitrile as products. In Patent 2,803,642, we have disclosed a process in which cyanogen and olefins are reacted at 700°–1000° C. to produce aliphatic nitriles.

It is an object of this invention to provide a new and improved method for preparing aliphatic nitriles.

Another object of our invention is to provide an improved method for the preparation of aliphatic nitriles by the reaction of a $C_2$–$C_{20}$ alkane or alkene with cyanogen or hydrogen cyanide in the presence of a catalyst.

A feature of this invention is the provision of an improved process for the reaction of a $C_2$–$C_{20}$ alkane or alkene with hydrogen cyanide or cyanogen at a temperature of about 475°–1000° C. in the presence of a catalyst.

Another feature of this invention is the provision of an improved process for the reaction of a $C_2$–$C_{10}$ alkane or alkene with hydrogen cyanide or cyanogen in the presence of a catalyst consisting of a group VIII noble metal supported on a suitable refractory support, at a temperature of about 475°–1000° C.

Other objects and features of this invention will become apparent from time to time throughout the specification and claims as hereinafter related.

In accordance with our invention, a mixture of one or more $C_2$–$C_{20}$ alkanes or alkenes and cyanogen or hydrogen cyanide are mixed and heated to a temperature in the range from about 475° to 1000° C. (preferably 475°–700° C.) in contact with a group VIII noble metal-containing catalyst. Within this range of temperature and in the presence of a group VIII noble metal-containing catalyst, the hydrocarbon reacts readily with the cyanogen or with the hydrogen cyanide in accordance with the following reactions:

(1)  $RH+(CN)_2 \rightarrow RCN+HCN$
(2)  $RH+HCN \rightarrow RCN+H_2$ where R is alkyl or alkenyl.

These reactions proceed well at atmospheric pressure, although they can be carried out at either subatmospheric or superatmospheric pressures. In the temperature range from about 475° to 700° C., substantial yields of aliphatic nitriles are obtained while no such nitriles are produced in the absence of the catalyst. At higher temperatures, the yield of nitriles decreases somewhat but the catalyst is still effective in promoting the reaction of hydrocarbons with cyanogen or hydrogen cyanide. In order to increase the yield per pass of the nitrile, based on the cyanogen or hydrogen cyanide charged, we prefer to use a molar excess of the hydrocarbon over that stoichiometrically required for the reaction. Although we prefer to use a mol ratio for hydrocarbon to cyanogen or hydrogen cyanide in the range from about 2–10/1, the mol ratio may vary widely as, for example, from 1–20 mols of the alkane or alkene to 20–1 mols cyanogen or hydrogen cyanide. In carrying out this reaction, any alkane or alkene which contains 2–20 carbon atoms per molecule may be used. Thus, ethane, ethylene, propane, propylene, butane, butene, hexane, hexene, octane, octene, decane, decene, dodecane, dodecene, hexadecane, hexadecene, octadecane, octadecene, and eicosane, whether straight chain or branched chain, are all suitable hydrocarbons for use in this process, although the higher-molecular-weight hydrocarbons have some tendency to crack and form nitriles of the fragments produced upon cracking. Methane is specifically excluded from this process inasmuch as we have found that methane and cyanogen react in the presence of the catalyst to produce hydrogen cyanide without producing any significant amount of aliphatic nitriles.

The reactant gases, in this process, may be passed through the reaction zone at a gaseous hourly space velocity of approximately 50 to 2000, but we prefer to operate our process at a space velocity of approximately 200–400. Space velocity, as used herein, is defined as the ratio of the volume of gases at standard temperature and pressure charged per hour to the volume of the reaction space. In carrying out our process, the cyanogen or hydrogen cyanide and the hydrocarbon may either be premixed and preheated or may be separately charged to the reaction zone maintained at the desired reaction temperature. If desired, the reactants may be mixed with an inert diluent gas. Any type of reaction zone may be used which is resistant to corrosion or attack by the reactants or reaction products, including such materials as quartz or high-silica glass or stainless steel. The reaction zone may be heated electrically, or by combustion gases applied externally or through heating tubes placed within the reactor, or the reaction zone may be filled with refractory pebbles which are intermittently heated to the desired temperature.

When cyanogen is used as one of the reactants, the reaction effluent from the reactor comprises hydrogen cyanide, the aliphatic nitrile produced in the reaction, and unconverted hydrocarbon and/or cyanogen, as well as small amounts of other by-products. When hydrogen cyanide is one of the reactants, the reaction effluent comprises hydrogen, the aliphatic nitrile product, and unconverted hydrocarbon and/or hydrogen cyanide, as well as small amounts of other by-products. In either embodiment of the process, the reaction effluent is cooled to a temperature sufficiently low to condense the aliphatic nitrile product, which can then be separated by fractionation to obtain substantially pure nitriles therefrom. Where hydrogen cyanide is a reaction by-product, it may be recovered and purified and used for further reaction in this process or may be converted by a suitable partial oxidation process to cyanogen. Any unreacted hydrogen cyanide, cyanogen, or hydrocarbons can be recycled to the reaction zone in admixture with fresh charge gases so as to convert them to further quantities of aliphatic nitriles.

The following non-limiting examples are illustrative of the scope of this invention.

*Example I*

A series of experiments were carried out using an electrically-heated Vycor (a high-silica glass) tube as the reactor. The reactor tube was charged with a granular catalyst consisting of 0.5% w. rhodium on alumina, which had been predried at 500°–600° C. for about 17 hours. In these experiments, a gaseous mixture of cyanogen, ethane, and helium was charged at atmospheric pressure to the catalyst bed in the electrically-heated Vycor tube. The effluent gases from the reaction zone were passed through a water condenser. Liquid products were identified by infrared analysis, while gas samples of the charge gas and the product gases (taken after the gas had passed through the condenser) were analyzed by the mass spectrometer.

In the first run, a mixture of reactant gases, containing ethane and cyanogen in a ratio of 2.93 and helium diluent were passed through the reactor at a gaseous hourly space velocity of 376 for a period of 90 minutes. The reactor was maintained at a temperature of 600°–640° C. during the reaction period. During this reaction period 100% of the cyanogen was consumed. From this reaction acetonitrile was obtained in a yield of 60% and propionitrile in a yield of 58%, based on the cyanogen. The yield of these products is defined as the number of mols of products divided by the number of mols of cyanogen charged.

In a second run of 90 minutes duration, ethane and cyanogen were charged in a 3.51 mol ratio, at a gaseous hourly space velocity of 366 and reaction temperature of 600°–612° C. In this experiment, 100% of the cyanogen was consumed. From the product gases, acetonitrile was obtained in a 36.9% yield and propionitrile in a 31.6% yield based on the cyanogen charged.

In another run of 90 minutes duration, ethane and cyanogen were charged in a 3.70 mol ratio, at a gaseous hourly space velocity of 378 and reaction temperature of 735° C. In this experiment, all of the cyanogen was consumed. From the product gases, acetonitrile was obtained in a 24.8% yield and propionitrile in a 25.4% yield, based on the cyanogen charged. In a similar run at 845° C., the total yield of nitriles decreased to about 31%. While the process is operative at higher temperatures, better yields of nitriles are obtained at temperatures less than about 700° C. When ethane and cyanogen are reacted at temperatures of 500° C. and 475° C., substantial yields of aliphatic nitriles are obtained.

When ethane and cyanogen in a mol ratio of about 3, together with helium diluent, are heated to 600°–650° C., at a space velocity of about 370, in the absence of the catalyst no reaction is obtained. Some of the cyanogen is converted into paracyanogen and some of the ethane is decomposed but no nitriles are obtained as products. When ethane and cyanogen are heated to temperatures substantially in excess of 700° C., e.g., 850° C., ethylene and acrylonitrile are obtained as the principal products, no alkyl nitriles being formed under these conditions.

*Example II*

In another series of experiments, ethane and cyanogen in a mol ratio of about 3, a gaseous hourly space velocity of about 370, and reaction temperature of 600°–650° C. are passed through the reactor tube using a different catalyst in each of several runs. In this series of reactions, the catalysts used are (1) 0.5% w. platinum on alumina, (2) 0.5% w. palladium on alumina, (3) 0.5 w. iridium on alumina, (4) 0.5% w. osmium on alumina, (5) 0.5% w. rhodium on pumice, (6) 0.5% w. palladium on silica. Using these catalysts and the reaction conditions indicated, alkyl nitriles, viz., acetonitrile and propionitrile, are obtained in yields in excess of 30%. Other catalysts, viz., chlorine, tetraethyl lead, and ethylene oxide, which are known free radical initiators, were tested and found to be ineffective in this process. Similarly, cracking catalysts, such as Thermofor cracking catalyst, are ineffective unless impregnated with a group VIII noble metal.

*Example III*

In another series of experiments, propane and cyanogen, together with helium diluent, are passed over a catalyst in the Vycor tube reactor as in the previous examples using the catalysts of Example II. In these experiments, propane and cyanogen are reacted at a temperature of about 650° C. in a mol ratio of propane to cyanogen of about 3.5, and a gaseous hourly space velocity of charge gases of about 400. In each run, using the catalysts of Example II, there is a 100% conversion of the cyanogen and a production of alkyl nitriles in excess of 30% yield. In these runs, the nitriles which are obtained are a mixture of acetonitrile, propionitrile, butyronitrile, and by-product hydrogen cyanide.

When propane and cyanogen are heated to 650° C. under the same conditions and the same ratio of reactants used in this series of runs in the absence of catalyst, there is a substantial conversion of cyanogen but no reaction with the propane. At higher temperature, viz., 800°–900° C., propane and cyanogen react without a catalyst to produce a mixture of ethylene, propylene, acrylonitrile, and methyl acrylonitrile.

*Example IV*

In another experiment, a petroleum fraction containing $C_5$–$C_{18}$ alkanes is vaporized into the Vycor tube reactor together with cyanogen and helium diluent, at a hydrocarbon/cyanogen mol ratio of 3.5. The reactants are passed through the reactor tube at a gaseous hourly space velocity of about 400, while the tube is maintained at a reaction temperature of 600°–650° C. Under these reaction conditions, there is obtained a mixture of alkyl nitriles containing from 2 to 18 carbon atoms per molecule. When this reaction is carried out at lower temperatures, the yield of nitriles decreases, substantially no reaction taking place below about 475° C.

*Example V*

Another series of experiments were carried out, using the apparatus described in Example I, to evaluate the effect of the catalysts used in this invention in the reaction of ethylene and cyanogen.

Ethylene and cyanogen in mol ratio of 3.6 were charged, together with helium diluent, at a gaseous hourly space velocity of 578 and a reaction temperature of 575° C. The reactor was packed with 0.5% w. rhodium-on-alumina catalyst pellets. The cyanogen was completely consumed. From the product gases there was obtained acrylonitrile, 35.9% yield; acetonitrile, 25.0% yield; propionitrile, 64.5% yield; and hydrogen cyanide, 91.4% yield. Yields are calculated as mols of product as a percentage of the mols of cyanogen charged.

Ethylene and cyanogen in a mol ratio of 3.6 were charged, together with helium diluent, at a gaseous hourly space velocity of 582 and a reaction temperature of 645° C., as in the previous run. The cyanogen was completely consumed. The product gases contained: acrylonitrile, 11.3% yield; acetonitrile, 13.8% yield; propionitrile, 14.1% yield; and hydrogen cyanide, 161% yield. It is noted, however, that this reaction is limited to alkanes and alkenes. Acetylene does not react appreciably with cyanogen, either alone or in the presence of the rhodium-on-alumina catalyst.

*Example VI*

In another series of experiments, propylene and cyanogen, together with helium diluent, are passed over a catalyst in the Vycor tube reactor as in the previous examples using the catalysts of Example II. At a reaction temperature of 550°–650° C. using a propylene/cyanogen mol ratio of about 3.6, and a gaseous hourly space velocity of about 500, the consumption of cyanogen is complete and a substantial yield of a mixture of aliphatic nitriles is obtained. Under these same conditions, in the absence of the catalyst, the cyanogen is consumed but substantially no aliphatic nitriles are obtained. When other $C_2$–$C_{20}$ alkenes are reacted with cyanogen at 475°–1000° C. (preferably 475°–700° C.) over a group VIII noble metal catalyst, substantial yields of aliphatic nitriles are obtained.

*Example VII*

In still another series of experiments, hydrogen cyanide and ethane were reacted in the Vycor tube reactor using the 0.5% w. rhodium-on-alumina catalyst. In the first run, ethane and hydrogen cyanide in a mol ratio of 2.62, together with helium diluent, were passed through the Vycor tube reactor, containing 0.5% w. rhodium-on-alumina catalyst, at a gaseous hourly space velocity of 391. The reactor tube was maintained at a reaction temperature of 560° C., the duration of the reaction being 60 minutes. Under these reaction conditions, there was a 70.6% conversion of hydrogen cyanide and a 13.0% conversion of ethane. A 16.3% yield of acetonitrile and 10.1% yield of propionitrile were obtained, based upon hydrogen cyanide charged to the reaction. There was also obtained a 13.5% yield of hydrogen, as by-product, based on the hydrogen cyanide charged.

In a second run, ethane and hydrogen cyanide in a mol ratio of 2.27, together with helium diluent, were passed through the Vycor tube reactor at a gaseous hourly space velocity of 396. The reactor tube was maintained at a reaction temperature of 655° C., the duration of the reaction being 30 minutes. Under these reaction conditions, there was a 66.6% conversion of hydrogen cyanide and a 27.1% conversion of ethane. Under these conditions, there was obtained a 21.3% yield of the acetonitrile and a 5.4% yield of propionitrile, and a 36.0% yield of by-product hydrogen, based on hydrogen cyanide charged to the reaction.

*Example VIII*

In another series of runs, propane and hydrogen cyanide in a mol ratio of about 2.5, together with helium diluent are passed through the Vycor tube reactor using each of the various catalysts of Example II. The reactor tube is maintained at a reaction temperature of about 600° C. The reactants are charged at a gaseous hourly space velocity of about 400 for a period of 90 minutes. In each of these runs, there is obtained a mixture of acetonitrile, propionitrile, butyronitrile, hydrogen, and unreacted hydrogen cyanide and propane. Hydrogen cyanide similarly reacts with other $C_2$-$C_{20}$ alkanes, e.g., a broad petroleum cut consisting essentially of saturated paraffins, upon contact with group VIII metal-containing catalysts at a temperature of 475°–1000° C.

*Example IX*

Another series of experiments were carried out, using the apparatus described in Example I, to evaluate the effect of the catalysts used in this invention in the reaction of ethylene and hydrogen cyanide.

Ethylene and hydrogen cyanide in mol ratio of 2.5 were charged, together with helium diluent, at a gaseous hourly space velocity of 535 and a reaction temperature of 555° C. The reactor was packed with 0.5% w. rhodium-on-alumina catalyst pellets. The hydrogen cyanide was 79.2% consumed, while 57.3% of the ethylene was consumed. From the product gases, there was obtained acrylonitrile, 5.2% yield; acetonitrile, 29.7% yield; propionitrile, 27.8% yield; and hydrogen, 7.1% yield. Yields of nitriles are calculated as mols of product as a percentage of the mols of hydrogen cyanide charged, while yields of hydrogen are calculated as a percentage of the mols of ethylene charged.

Ethylene and hydrogen cyanide in a mol ratio of 2/1 were charged, together with helium diluent, at a gaseous hourly space velocity of 505 and a reaction temperature of 660° C., as in the previous run. The hydrogen cyanide was 42.1% consumed, while 70.0% of the ethylene was consumed. The product gases contained: acrylonitrile, 2.4% yield; acetonitrile, 9.1% yield; propionitrile, 2.9% yield; and hydrogen, 48.1% yield. It is noted, however, that this reaction is limited to alkanes and alkenes. Acetylene does not react appreciably with hydrogen cyanide, either alone or in the presence of the rhodium-on-alumina catalyst to substitute a CN radical for one of the hydrogen atoms thereof.

*Example X*

In another series of experiments, propylene and hydrogen cyanide, together with helium diluent, are passed over a catalyst in the Vycor tube reactor as in the previous examples using the catalysts of Example II. At a reaction temperature of 550°–650° C. using a propylene-hydrogen cyanide mol ratio of about 3.6, and a gaseous hourly space velocity of about 500, the consumption of hydrogen cyanide is about 50–70% and substantial yield of a mixture of aliphatic nitriles is obtained. Under these same conditions, in the absence of the catalyst, a substantial proportion of the hydrogen cyanide is consumed but substantially no aliphatic nitriles are obtained. When other $C_2$–$C_{20}$ alkenes are reacted with hydrogen cyanide at 475°–1000° C. (preferably 475°–700° C.) over a group VIII noble metal catalyst, substantial yields of aliphatic nitriles are obtained.

The catalysts which are effective in the reaction of cyanogen and/or hydrogen cyanide with $C_2$–$C_{20}$ alkanes and alkenes are the group VIII noble metals, preferably supported on a suitable refractory support. The group VIII noble metals are effective as catalysts in this process in pure metallic form, e.g., platinum sponge or palladium sponge, although these metals are too expensive to be used in such a manner. The group VIII noble metals which are useful as catalysts in this reaction are preferably supported on a suitable refractory support, such as alumina, activated alumina, silica, silica gel, pumice, aluminum silicate, zirconia, titania, etc. The refractory support, however, should not be catalytically active in promoting reactions which compete with the desired reaction. Thus, acidic mixed oxides, e.g., silica-alumina, which are hydrocarbon cracking catalysts are not desirable as supports for the noble metal catalyst of this invention. Suitable catalysts for the process include rhodium on alumina, rhodium on activated alumina, rhodium on silica gel, rhodium on pumice, platinum on pumice, patinum on alumina, platinum on activated alumina, palladium on alumina, palladium on activated alumina, osmium on pumice, osmium on alumina, osmium on activated alumina, and osmium on silica gel, the noble metal preferably being present to the extent of 0.05–5.0% w. of the catalyst support. The term group VIII noble metal-containing catalyst, as used in the claims, is hereby defined as and limited to the group VIII noble metals in metallic form, either alone or supported on an inert refractory support as above described.

While we have described our invention fully and completely as required by the patent laws, with special emphasis upon several preferred embodiments thereof, we wish it to be understood that within the scope of the appended claims this invention may be practiced otherwise than as specifically described.

What is claimed is:

1. A method of preparing aliphatic nitriles selected from the group consisting of alkyl nitriles and alkenyl nitriles which consists of heating a mixture of at least one hydrocarbon selected from the group consisting of $C_2$–$C_{20}$ alkanes and alkenes with at least one compound selected from the group consisting of cyanogen and hydrogen cyanide, to a temperature in the range of about 475°–700° C., contacting the heated mixture with a catalyst consisting essentially of 0.05–5.0% w. of a group VIII noble metal on a refractory support which is catalytically inactive in promoting competing reactions, at a gaseous hourly space velocity of about 50–2000 and a mol ratio of reactants in the range from 0.05–20 mols of the first named reactant per mol of the second named reactant.

2. A method in accordance with claim 1 in which the hydrocarbon is ethane and the product nitriles are a mixture of acetonitrile and propionitrile.

3. A method in accordance with claim 1 in which the hydrocarbon is propane and the product nitriles are a mixture of acetonitrile, propionitrile, and butyronitrile.

4. A method in accordance with claim 1 in which a mixture of hydrocarbons is reacted with a compound of the group consisting of cyanogen and hydrogen cyanide and the product nitriles are a mixture of aliphatic nitriles derived from the reactant hydrocarbons.

5. A method in accordance with claim 1 in which the reactant hydrocarbon is ethylene.

6. A method in accordance with claim 1 in which the reactant hydrocarbon is propylene.

7. A method in accordance with claim 1 in which the catalyst consists essentially of rhodium supported on alumina.

8. A method in accordance with claim 1 in which the catalyst consists essentially of platinum supported on alumina.

9. A method in accordance with claim 1 in which the catalyst consists essentially of palladium supported on alumina.

10. A method in accordance with claim 1 in which the catalyst consists essentially of iridium supported on alumina.

11. A method in accordance with claim 1 in which the catalyst consists essentially of osmium supported on alumina.

12. A method of preparing aliphatic nitriles which comprises reacting ethane with a compound selected from the group consisting of cyanogen and hydrogen cyanide at a temperature of about 600° C. over a catalyst consisting essentially of 0.5% w. rhodium-on-alumina, and recovering acetonitrile and propionitrile as major products.

13. A method of preparing aliphatic nitriles which comprises reacting ethylene with a compound selected from the group consisting of hydrogen cyanide and cyanogen at a temperature of about 600° C. over a catalyst consisting essentially of 0.5% w. rhodium-on-alumina, and recovering acetonitrile and propionitrile as major products.

14. A method of preparing aliphatic nitriles which comprises reacting propane with a compound selected from the group consisting of cyanogen and hydrogen cyanide at a temperature of about 600° C. over a catalyst consisting essentially of 0.5° w. rhodium-on-alumina, and recovering acetonitrile, propionitrile, and butyronitrile as major products.

15. A method of preparing aliphatic nitriles which comprises reacting propylene with a compound selected from the group consisting of hydrogen cyanide and cyanogen at a temperature of about 600° C. over a catalyst consisting essentially of 0.5% w. rhodium-on-alumina, and recovering acetonitrile, propionitrile, and butyronitrile as major products.

References Cited in the file of this patent

UNITED STATES PATENTS

| | | |
|---|---|---|
| 2,780,638 | Ayers et al. | Feb. 5, 1957 |
| 2,802,020 | Fierce et al. | Aug. 6, 1957 |
| 2,803,642 | Fierce et al. | Aug. 20, 1957 |
| 2,809,987 | Fierce et al. | Oct. 15, 1957 |